(12) United States Patent
Horiuchi et al.

(10) Patent No.: US 12,455,270 B2
(45) Date of Patent: Oct. 28, 2025

(54) MESH FOR DISSOLUTION TEST

(71) Applicant: Shionogi & Co., Ltd., Osaka (JP)

(72) Inventors: Kensuke Horiuchi, Hyogo (JP); Satoyo Matsuura, Osaka (JP); Maki Okabe, Osaka (JP)

(73) Assignee: SHIONOGI & CO., LTD., Osaka (JP)

( * ) Notice: Subject to any disclaimer, the term of this patent is extended or adjusted under 35 U.S.C. 154(b) by 341 days.

(21) Appl. No.: 17/601,539

(22) PCT Filed: Apr. 7, 2020

(86) PCT No.: PCT/JP2020/015655
§ 371 (c)(1),
(2) Date: Oct. 5, 2021

(87) PCT Pub. No.: WO2020/209249
PCT Pub. Date: Oct. 15, 2020

(65) Prior Publication Data
US 2022/0178901 A1    Jun. 9, 2022

(30) Foreign Application Priority Data
Apr. 8, 2019   (JP) ................................ 2019-073251

(51) Int. Cl.
*G01N 33/15*  (2006.01)
*G01N 13/00*  (2006.01)
*B01F 21/10*  (2022.01)

(52) U.S. Cl.
CPC ............ *G01N 33/15* (2013.01); *G01N 13/00* (2013.01); *B01F 21/10* (2022.01); *B01L 2300/0609* (2013.01); *G01N 2013/006* (2013.01)

(58) Field of Classification Search
CPC .. G01N 33/15; G01N 2013/006; G01N 13/00; B01L 2300/0609; B01F 21/10
See application file for complete search history.

(56) References Cited

U.S. PATENT DOCUMENTS 5,412,979 A * 5/1995 Fassihi ................... G01N 13/00
  73/866
5,827,984 A * 10/1998 Sinnreich ............... G01N 13/00
  73/866

(Continued)

FOREIGN PATENT DOCUMENTS

EP    2 979 698    2/2016
JP    2-15825     4/1990

(Continued)

OTHER PUBLICATIONS

International Preliminary Report on Patentability issued Oct. 21, 2021 in International (PCT) Application No. PCT/JP2020/015655.

(Continued)

*Primary Examiner* — Nathaniel J Kolb
(74) *Attorney, Agent, or Firm* — Wenderoth, Lind & Ponack, L.L.P.

(57) ABSTRACT

When the mesh is placed under the bottom of a blade and over the bottom of a vessel in the dissolution test assembly equipped with either a vessel specified in the dissolution test method of the Japanese Pharmacopoeia, the United States Pharmacopoeia or the European Pharmacopoeia or a vessel used for the dissolution test, and a paddle formed from a blade and a shaft, and the suspensions and the solid dosage forms are added to or placed at the said mesh, a drug dissolves from the said dosage forms and the dissolution ratio variation between the said multiple same dosage forms can be small.

8 Claims, 6 Drawing Sheets

(56) References Cited

U.S. PATENT DOCUMENTS

| | | | |
|---|---|---|---|
| 8,043,270 B2 * | 10/2011 | Burke | B01F 25/4511 604/288.01 |
| 2005/0166688 A1 * | 8/2005 | Tian | G01N 33/15 73/866 |
| 2006/0005641 A1 * | 1/2006 | Kraft | B01F 21/15 73/866 |
| 2007/0209455 A1 | 9/2007 | Tian et al. | |
| 2010/0126287 A1 | 5/2010 | Burke et al. | |
| 2011/0229380 A1 * | 9/2011 | Sheu | G01N 33/15 422/547 |
| 2012/0034704 A1 * | 2/2012 | Hughes | G01N 33/15 422/62 |
| 2016/0045479 A1 | 2/2016 | Takae et al. | |

FOREIGN PATENT DOCUMENTS

| | | |
|---|---|---|
| JP | 2-264862 | 10/1990 |
| JP | 2004-233332 | 8/2004 |
| JP | 2008-32482 | 2/2008 |
| JP | 2008-175603 | 7/2008 |
| JP | 2010-526147 | 7/2010 |
| WO | 2008/137504 | 11/2008 |
| WO | 2014/157603 | 10/2014 |

OTHER PUBLICATIONS

International Search Report dated Jul. 14, 2020 in International (PCT) Application No. PCT/JP2020/015655, with English language translation.

"Biopharmaceutics Modeling and Simulations Theory, Practice, Methods and applications", p. 176.

Japanese Pharmacopoeia, Seventeenth Edition, 6.10 (1.2), 6.13(1.), 2016, pp. 141-149.

Dissolution apparatus: apparatus 5 (paddle over disk) & apparatus 6 [online], Apr. 4, 2017, https://knowledgeofpharma.blogspot.com/2017/04/dissolution-apparatus-apparatus-5.html, apparatus:-5 (Peddle Over Disk).

Suzuki, Ikuo et al., "Drug Release Test of Transdermal Patches: Factors Affecting Drug Release", Annual report of Tokyo Metropolitan Institute of Public Health, 2017, vol. 68, pp. 85-90, with English Abstract.

Office Action issued Nov. 14, 2024 in European Patent Application No. 20 787 320.9.

* cited by examiner

[FIG.1]
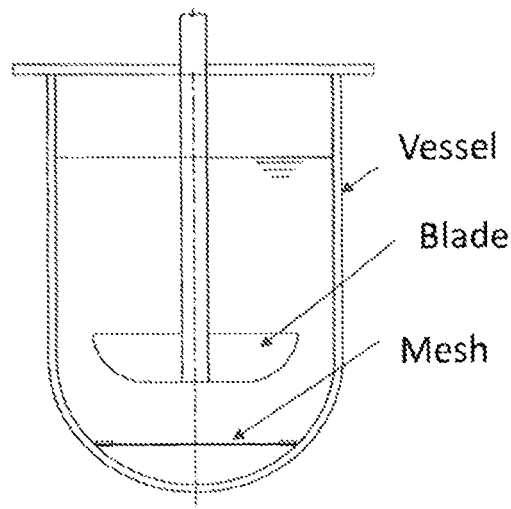
[FIG.2]
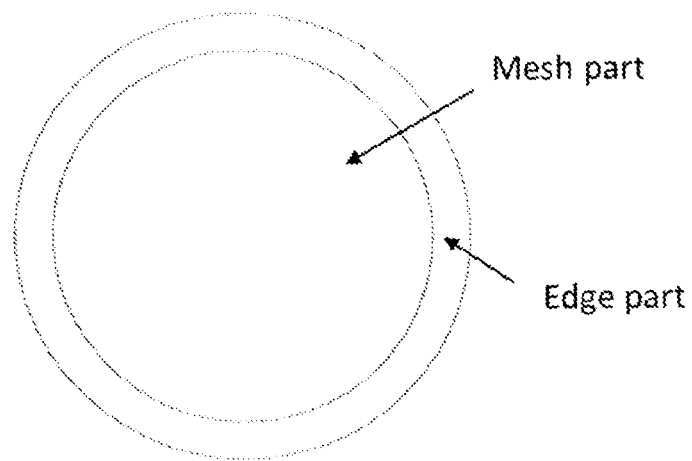

[FIG.3]
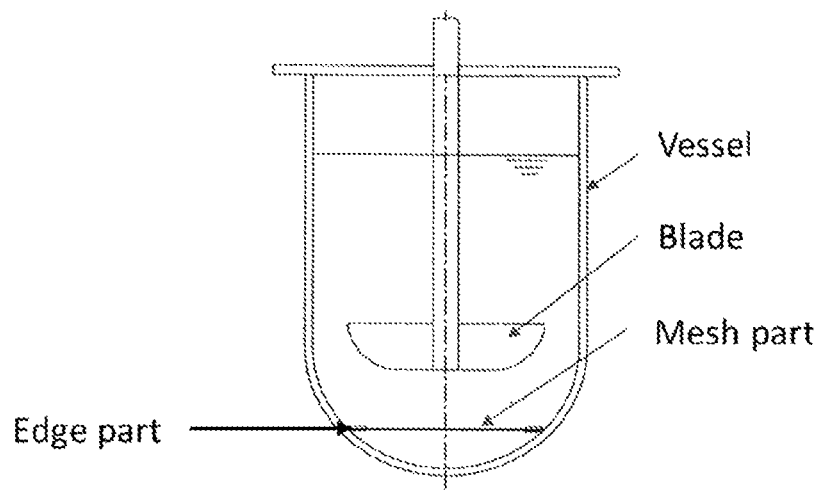
[FIG.4]
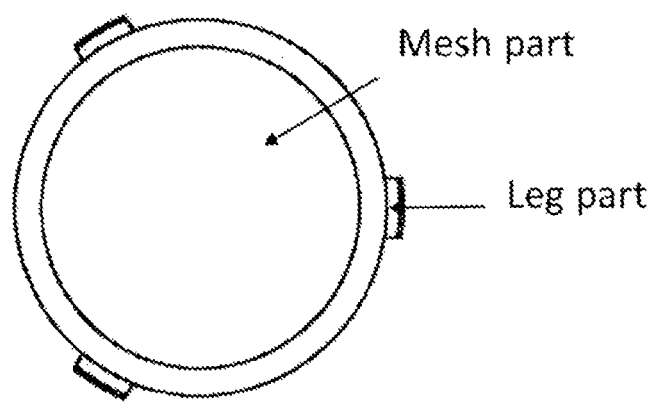

[FIG.5]
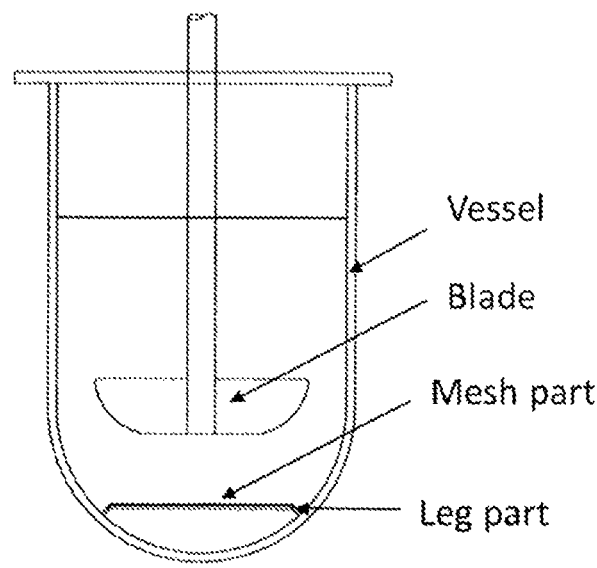
[FIG.6]
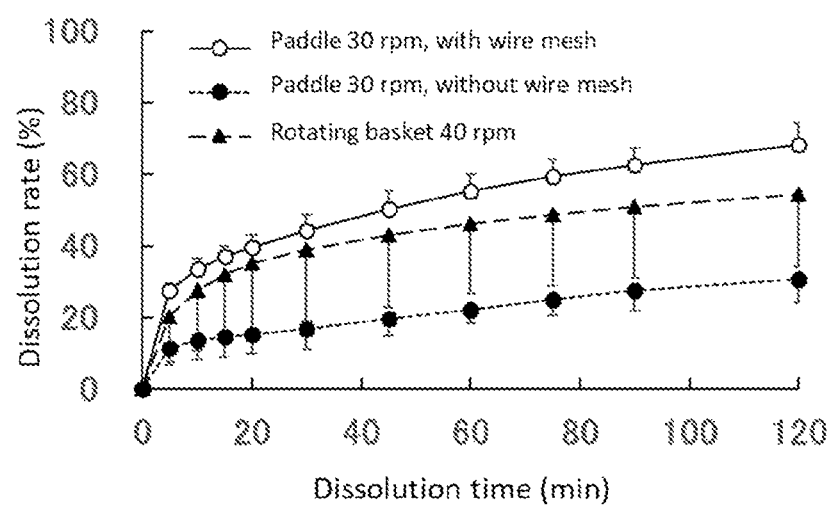

[FIG.7]
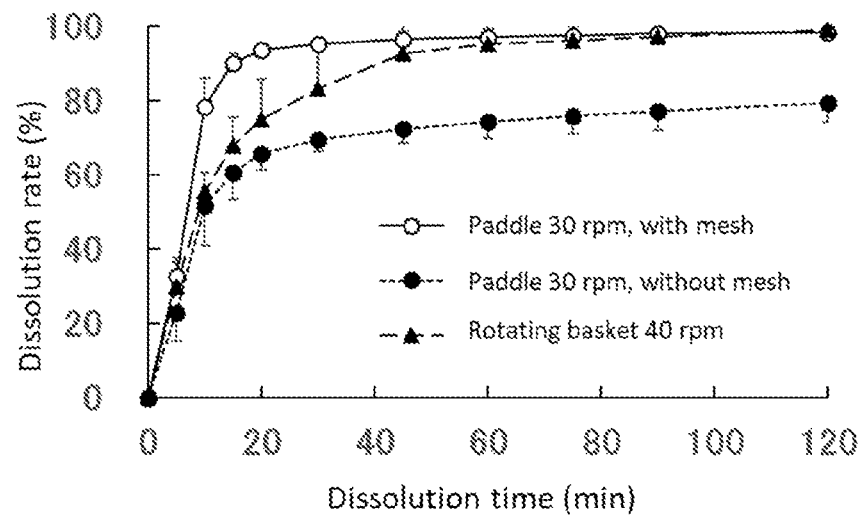
[FIG.8]
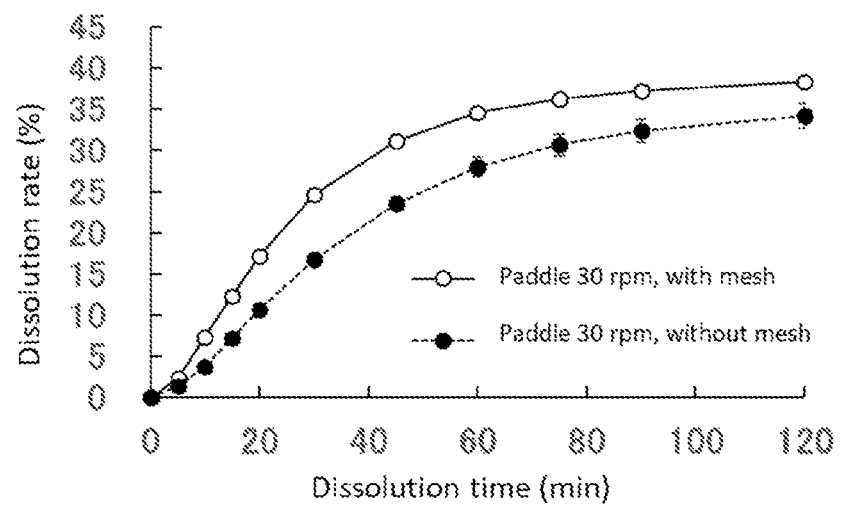

[FIG.9]
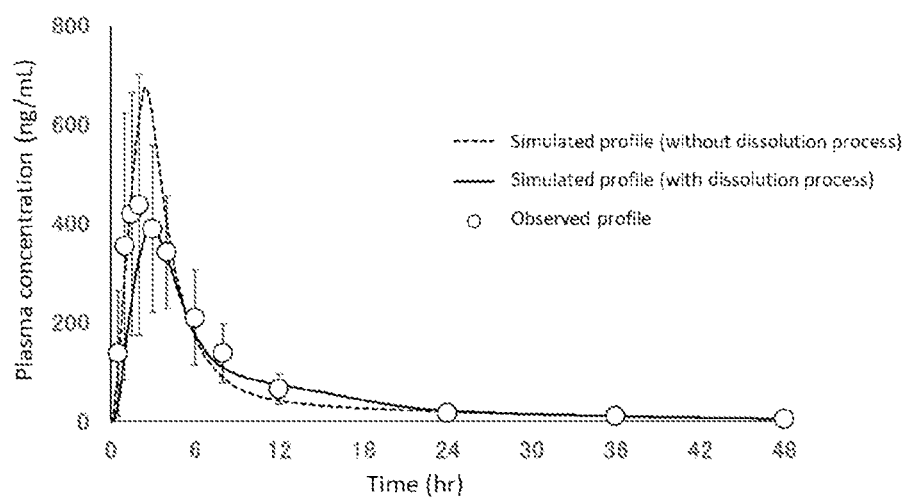
[FIG.10]
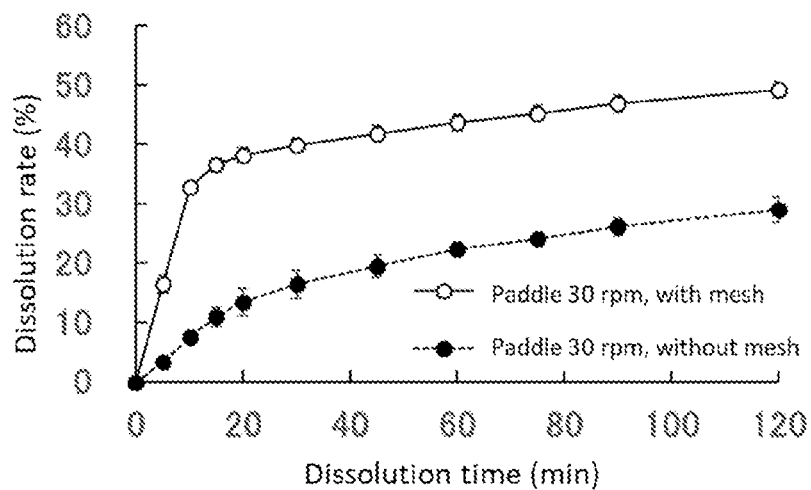

[FIG.11]
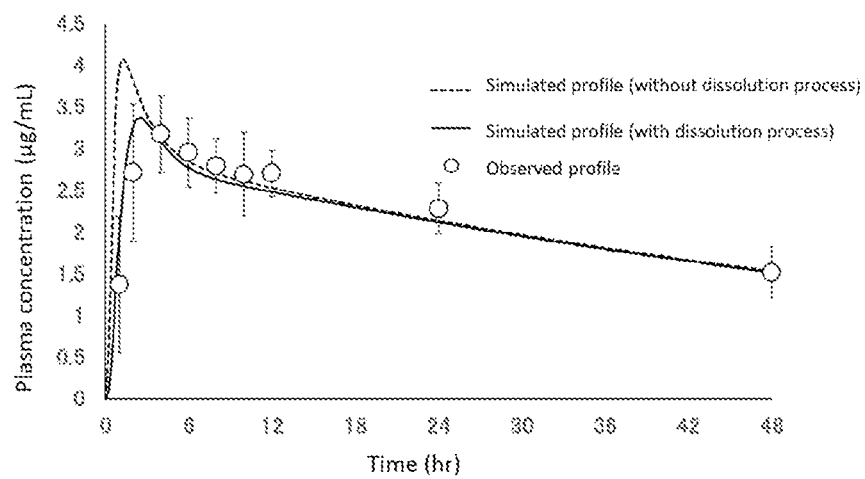

MESH FOR DISSOLUTION TEST

TECHNICAL FIELD

The present invention relates to a mesh for the dissolution test, which is placed under the bottom of a blade and over the bottom of a vessel in the dissolution test assembly for suspensions or solid dosage forms equipped with a vessel specified in the dissolution test method of the Japanese Pharmacopoeia, the United States Pharmacopoeia or the European Pharmacopoeia or a vessel used for the dissolution test, and a paddle comprising a blade and a shaft. In detail, it relates to either a mesh placed at 5 to 35 mm under the bottom of a blade or a mesh placed at 1 to 30 mm over the bottom of the vessel, a vessel placing the mesh, and a dissolution test assembly equipped with the vessel and the paddle comprising a blade and a shaft.

BACKGROUND ART

A dissolution test method specified in the Japanese Pharmacopoeia (commonly known as "Pharmacopeia") is known as a general method for evaluating the dissolution property of drugs from tablets, capsules, and the like. The dissolution test methods include Apparatus 1 (Basket Apparatus) and Apparatus 2 (Paddle Apparatus). In Apparatus 1, a test medium is added to a dissolution test vessel in a dissolution test assembly (hereinafter sometimes referred to as a "vessel") and a basket containing the dosage forms in the medium is rotated to measure the dissolution ratio. In Apparatus 2, a test medium is added to a vessel, the dosage forms are added to the medium and a blade of a paddle is rotated in the medium to measure the dissolution ratio.

CITATION LIST

Patent Literature

[Patent Literature: 1] JP laid-open application publication No. H2-264862
[Patent Literature: 2] JP laid-open application publication No. 2004-233332
[Patent Literature: 3] JP laid-open application publication No. 2008-32482

Non-Patent Literature

[Non-Patent Literature: 1] Biopharmaceutics Modeling and Simulations Theory, Practice, Methods and applications (by Kiyohiko Sugano)

SUMMARY OF INVENTION

Problem to be Solved by the Invention

The paddle speed of the dissolution test assembly for the above-mentioned Apparatus 2 (Paddle Apparatus) is usually 50 to 75 rpm. However, according to Non-Patent Literature 1, in order to reproduce the dissolution property in the gastrointestinal tract, the speed should be controlled to 10 to 30 rpm, which is lower than the above-mentioned speed. As described, compared with the high rotation speed, the low rotation speed 1) lowers the dissolution ratio of the drugs from the dosage forms and 2) enlarges the dissolution ratio variation when measuring the multiple identical dosage forms, of tablets or capsules containing the poorly soluble drugs or the insoluble inactive ingredients.

We investigated various root causes which lower the dissolution ratio of the drugs from the dosage forms and enlarge the dissolution ratio variation when measuring the dissolution ratio of multiple identical dosage forms in tablets and capsules containing the poorly soluble drugs. As a result, it was clarified that it was caused by a phenomenon that the poorly soluble drugs and the insoluble inactive ingredients contained in the dosage forms are accumulated on the bottom of the vessel of the dissolution test assembly, commonly known as coning.

Various patents have been applied for the dissolution test assembly (Patent Literature 1). In relation to orally disintegrating tablets, the assembly performing a disintegration test closer to in vivo condition has been applied for patents (Patent Literatures 2 and 3). However, the documents neither describe nor suggest the assembly and the tool considering the dissolution prosperity in the gastrointestinal tract and further preventing coning.

Means for Solving the Problem

In view of the above circumstances, the inventors have conducted diligent studies and found that the drug is continuously released from the dosage forms even when the blade is rotated at a low speed, in case that a mesh is placed in the vessel of the dissolution test assembly and suspensions, solid dosage forms or the like are added to or placed on the said mesh. Furthermore, we found that the dissolution ratio variation can be small when multiple dissolution tests are performed for the same dosage forms.

Specifically, this present invention relates to:

(1) A mesh for the dissolution test of suspensions or solid dosage forms, which is placed under the bottom of a blade and over the bottom of a vessel in a dissolution test assembly equipped with a vessel specified in the dissolution test method of the Japanese Pharmacopoeia, the United States Pharmacopoeia or the European Pharmacopoeia or a vessel used in the dissolution test, and a paddle comprising from a blade and a shaft.
(2) The mesh according to (1), wherein the mesh is placed at 5 to 35 mm under the bottom of a blade.
(3) The mesh according to (1), wherein the mesh is placed at, 1 to 30 mm over the bottom of the vessel.
(4) The mesh according to (2) or (3), wherein the mesh is placed at 5 to 35 mm under the bottom of a blade and at 1 to 30 mm over the bottom of the vessel.
(5) The mesh according to any one of (1) to (4), wherein the mesh is formed into a circle with a diameter between 10 and 95 mm.
(6) The mesh according to any one of (1) to (5), wherein the mesh has a sieve opening of 2 to 200 mesh.
(7) The mesh according to any one of (1) to (6), wherein the edge part is provided at the end of the mesh.
(8) The mesh according to any one of (1) to (7), wherein the leg part is provided with the mesh.
(9) The mesh according to any one of (1) to (8) to prevent coning of a suspension or a solid dosage forms in a dissolution test.
(10) A mesh for use in dissolution test of a suspension or solid dosage forms, which is placed under the bottom of a blade and over the bottom of a vessel in dissolution test assembly equipped with a vessel specified in the dissolution test method of the Japanese Pharmacopoeia, the United States Pharmacopoeia or the European Pharmacopoeia or a vessel used in the dissolution test, and a paddle comprising a blade and a shaft, wherein the mesh is formed into a circle with a diameter between 10 and 95 mm and a sieve opening of 2 to 200 mesh to prevent coning of a suspension or a solid dosage form in dissolution test.
(11) A vessel for arranging the mesh according to any one of (1) to (10)
(12) A dissolution test assembly equipped with the vessel according to (11) and a paddle comprising a blade and a shaft.
(13) A dissolution test assembly equipped with a vessel according to (11) and a paddle comprising a blade and an adjustable length shaft.
(14) A dissolution test method, in which a suspension or a solid dosage forms is added to or placed on the mesh according to any one of (1) to (10).
(15) A dissolution test method, in which a suspension or a solid dosage forms in a sinker is added to or placed on the mesh according to any one of (1) to (10).
(16) The method according to (14) or (15), wherein a suspension or a solid dosage forms is added to or placed on the mesh according to any one of (1) to (10) and the rotation speed of the paddle is 10 to 75 rpm.
(17) The method according to any one of (14) to (16), wherein a suspension or a solid dosage forms is added to or placed on the mesh according to any one of (1) to (10), the rotation speed of the paddle is 10 to 75 rpm, and the CV % of the dissolution ratio is 20% or less.

Effect of the Invention

The dosage forms hardly accumulate (cone) on the vessel of the dissolution test assembly, even when oral dosage forms containing poorly soluble drugs, particularly suspensions or solid dosage forms such as tablets and capsules, are added to or placed on the mesh of the present invention and the dissolution test is performed by rotating the blade at a low speed by the paddle apparatus according to the behavior of the gastrointestinal tract. Therefore, even if suspensions or solid dosage forms such as tablets and capsules are added to or placed on the mesh of the present invention and the blade is rotated at a low speed by the paddle apparatus, the dissolution ratio variation between the dosage forms can be small when measuring the multiple identical dosage forms.

BRIEF DESCRIPTION OF THE DRAWINGS

FIG. 1 The figure represents that the mesh of the present invention is placed in the vessel of the dissolution test assembly.
FIG. 2 The figure represents the mesh with an edge of the present invention.
FIG. 3 The figure represents that the mesh with an edge of the present invention is placed in the vessel of the dissolution test assembly.
FIG. 4 The figure represents the mesh with legs of the present invention.
FIG. 5 The figure represents that the mesh with legs of the present invention is placed in the vessel of the dissolution test assembly.
FIG. 6 The figure represents dissolution behavior of Lipitor Tablets 10 mg
FIG. 7 The figure represents dissolution behavior of BAXO Capsules 20
FIG. 8 The figure represents dissolution behavior of Celecox Tablets 100 mg
FIG. 9 The figure represents plasma concentration by PK simulation of Celecox Tablets 100 mg FIG. 10 The figure represents dissolution behavior of Tegretol Tablets 200 mg
FIG. 11 The figure represents plasma concentration by PK simulation of Tegretol Tablets 200 mg

BEST MODE FOR CARRYING OUT THE INVENTION

Hereinafter, embodiments of the present invention are explained in detail. The mesh of the present invention is used for the dissolution test and is placed under the bottom of a blade and over the bottom of a vessel in a dissolution test assembly for the dissolution test method of the Japanese Pharmacopoeia, the United States Pharmacopoeia or the European Pharmacopoeia (hereinafter sometimes referred to as "dissolution test assembly") or a dissolution test assembly which is not compliant with the Japanese Pharmacopoeia but for the use of dissolution test method. The mesh of the present invention may be a mesh with a sieve opening, in particular, a mesh of a JIS standard, and a plate with a sieve opening such as a punching plate and a punching metal. The punching plate and punching metal are plates made by punching holes in a metal plate with a punching press die. In addition, there is a possibility that an error of about ±2 mm may occur in the arrangement position, diameter, thickness of the following mesh.

The mesh of the present invention is placed in the vessel, and as shown in FIG. 1, the mesh is placed substantially parallel to the blade of the paddle of the dissolution test assembly used for the "dissolution test method" specified in the Japanese Pharmacopoeia. The vessel may be a container used for the "dissolution test method" specified in the Japanese Pharmacopoeia. That is, the vessel has a circular cross section, a cylindrical bottom with a hemispherical shape, a volume of about 1 L, a height of 160 to 210 mm, an inner diameter of 98 to 106 mm, and an edge at the top of the container. The vessel can be covered to prevent evaporation of the test medium and the material may be a material that is not corroded by the test medium, such as glass or plastic.

The mesh of the present invention is placed in the vessel, but the mesh may also be used for a vessel which is not compliant with the dissolution test assembly for the "dissolution test method" in the Japanese Pharmacopoeia. For example, a vessel has a circular cross section, a cylindrical bottom with a hemispherical shape, a volume of about 100 to 500 ml, an inner diameter of 30 to 120 mm, and a height of 80 to 250 mm. Examples include a vessel with an inner diameter of 41.0 mm and a height of 108.00 mm, a vessel with an inner diameter of 41.0 mm and a height of 203.0 mm, a vessel with an inner diameter of 41.0 mm and a height of 176.3 mm, an inner diameter of 101.0 mm and a height of 99.5 mm. There is an edge at the top of the container. The vessel can be covered to prevent evaporation of the test medium. The material of the vessel may be a material that is not corroded by the test medium, such as glass or plastic.

The shape of the mesh of the present invention may be a shape that fits in the space of the vessel and is normally a circle, but the shape other than a circle such as a triangle, a quadrangle, a pentagon, a hexagon, an octagon, a decagon and a star are allowed.

The mesh of the present invention may be placed under the bottom of the blade in the dissolution test assembly, but is usually at 5 to 35 mm, preferably at 7.5 to 32, more preferably at 7.5 to 30 mm under the bottom of the blade.

The mesh of the present invention used for the dissolution test assembly in the dissolution test method specified in the Japanese Pharmacopoeia, the United States Pharmacopeia, or the European Pharmacopoeia is usually placed at 5 to 35 mm, preferably at 10 to 32.5 mm, more preferably at 15 to 30 mm and particularly preferably at about 25 mm under the bottom of the blade. If the position of the mesh from the bottom of the blade is smaller than this, there is a risk of contact between the blade and the dosage forms. If it is larger than this, the appropriate agitation force may not reach the dosage forms.

The mesh of the present invention may be placed over the inner bottom of the vessel in the dissolution test assembly, but is usually at 1 to 30 mm, preferably at 1 to 27.5 mm, more preferably at 1 to 25 mm over the inner bottom of the vessel.

The mesh of the present invention is used for the dissolution test assembly in the dissolution test method specified in the Japanese Pharmacopoeia, the United States Pharmacopeia, or the European Pharmacopoeia. It may be placed over the inner bottom of the vessel in the dissolution test assembly, but is usually at 5 to 30 mm, preferably at 10 to 27.5 mm, more preferably at 15 to 25 mm and particularly preferably about at 16 mm over the inner bottom of the vessel in the dissolution test assembly. If the position of the mesh from the inner bottom of the vessel is smaller than this, there is almost no space between the inner bottom of the vessel and the mesh, and compounds and inactive ingredients may accumulate on the bottom of the vessel. If it is larger than this, the appropriate agitation force may not reach the bottom of the vessel.

The mesh of the present invention may be placed under the bottom of the blade in the dissolution test assembly and over the inner bottom of the vessel. It is usually at 5 to 35 mm under the bottom of the blade and at 1 to 30 mm over the inner bottom of the vessel, preferably at 7.5 to 32.5 mm under the bottom of the blade and at 1 to 27.5 mm over the inner bottom of the vessel. More preferably, it is placed at 7.5 to 30 mm under the bottom of the blade and 1 to 25 mm over the inner bottom of the vessel.

The mesh of the present invention is used for the dissolution test assembly in the dissolution test method specified in the Japanese Pharmacopoeia, the United States Pharmacopeia, or the European Pharmacopoeia. It is usually placed at 5 to 35 mm under the bottom of the blade and at 5 to 30 mm over the inner bottom of the vessel. Preferably it is placed 10 to 32.5 mm under the bottom of the blade and 10 to 27.5 mm over the inner bottom of the vessel, more preferably at 15 to 30 mm under the bottom of the blade and at 15 to 25 mm over the inner bottom of the vessel, particularly preferably at about 25 mm under the bottom of the blade and at 16 mm over the inner bottom of the vessel.

When the shape of the mesh of the present invention is circular, the diameter of the mesh may be a diameter that can be placed in the vessel, but is usually 10 to 95 mm, preferably 12.5 to 90 mm, more preferably 15 to 85 mm.

When the mesh is used for the dissolution test assembly in the dissolution test method specified in the Japanese Pharmacopoeia, the United States Pharmacopeia, or the European Pharmacopoeia and the shape is circular, the diameter of is usually 40 to 95 mm, preferably 45 to 90 mm, more preferably 50 to 85 mm. If the diameter is smaller than this, there is little space between the inner bottom of the vessel and the mesh, and compounds and inactive ingredients may accumulate on the bottom of the vessel. If it is larger than this, the mesh may not be placed in the vessel.

The sieve opening of the mesh of the present invention is usually 2 to 200 mesh, preferably 5 to 100 mesh, and more preferably 10 to 60 mesh according to the JIS standard. In the case of the punching plate and punching metal, the opening is 0.07 to 12.0 mm, preferably 0.14 to 4.6 mm, and more preferably 0.25 to 2.3 mm. If the opening of the mesh, punching plate, and punching metal is larger than this, the dosage forms itself may pass through. If it is smaller than this, the disintegrated compounds and inactive ingredients in the dosage forms can be accumulated on the mesh.

Since the mesh of the present invention is placed on the bottom, the thickness of the mesh may be any thickness as long as it can stand water pressure. It is usually 0.04 to 2 mm, preferably 0.08 to 2 mm, more preferably 0.1 to 1.2 mm. If the mesh thickness is smaller than this, the mesh may not stand the water pressure, the weight of the dosage forms and may change the shape. If the thickness is larger than this, it may become heavier and damage the vessel.

When the shape of the mesh of the present invention is circular, the diameter of the mesh is usually 10 to 95 mm and the size of the sieve opening is 2 to 200 mesh. Preferably the diameter is 12.5 to 90 mm and the size of the opening is 5 to 100 mesh. More preferably the diameter is 15-85 mm and the size of the opening is 10 to 60 mesh. The mesh structure like this has a little risk of compounds, inactive ingredients and the like in the disintegrated dosage forms accumulating on the mesh.

When the mesh is used for the dissolution test assembly in the dissolution test method specified in the Japanese Pharmacopoeia, the United States Pharmacopeia, or the European Pharmacopoeia and the shape is circular, the diameter is usually 40 to 95 mm and the size of the sieve opening is 2-200 mesh. Preferably the diameter is 45-90 mm and the size of the sieve opening is 5-100 mesh. More preferably the diameter is 50 to 85 mm and the size of the sieve opening is 10 to 60 mesh. The mesh structure like this has a little risk of compounds, inactive ingredients and the like in the disintegrated dosage forms accumulating on the mesh and reduces the dissolution ratio variations between dosage forms.

The mesh of the present invention is used for a dissolution test of the suspensions and solid dosage forms. It is placed under the bottom of the blade and over the bottom of the vessel in the dissolution test assembly equipped with a vessel specified in the dissolution test method of the Japanese Pharmacopoeia, the United States Pharmacopeia, or the European Pharmacopoeia, or a vessel used for the dissolution test, and a paddle comprising a blade and a shaft. Further, when the shape of the mesh is circular, the diameter is 10 to 95 mm and the size of the sieve opening is 2 to 200 mesh, preferably the diameter is 12.5 to 90 mm and the size of sieve opening is 5 to 100 mesh, more preferably the diameter is 50 to 85 mm, and the size of the sieve opening is 10 to 60 mesh. The mesh structure like this has a little risk of compounds, inactive ingredients and the like in the disintegrated dosage forms accumulating on the mesh and reduces the dissolution ratio variations between dosage forms.

When the shape of the mesh is circular, the diameter is usually 10 to 95 mm, the size of the sieve opening is 2 to 200 mesh and the thickness is 0.04 to 2 mm. Preferably, the diameter is 12.5 to 90 mm, the size of the opening is 5 to 100 mesh and the thickness is 0.08 to 2 mm. More preferably the diameter is 15 to 85 mm, the size of the opening is 10 to 60 mesh and the thickness is 0.1 to 1.2 mm. The mesh structure like this has a little risk of compounds, inactive ingredients, and the like in the disintegrated dosage forms accumulating on the mesh and reduces the dissolution ratio variations between dosage forms.

When the mesh is used for the dissolution test assembly in the dissolution test method specified in the Japanese Pharmacopoeia, the United States Pharmacopeia, or the European Pharmacopoeia and the shape of the mesh is circular, the diameter of the mesh is usually 40 to 95 mm, the size of the sieve opening is 2-200 mesh and its thickness is 0.04 to 2 mm. Preferably the diameter is 45-90 mm, the size of the sieve opening is 5-100 mesh and the thickness is 0.08 to 2 mm. More preferably the diameter is 50 to 85 mm, the size of the sieve opening is 10 to 60 mesh and the thickness is 0.1 to 1.2 mm. The mesh structure like this has a little risk of compounds, inactive ingredients and the like in the disintegrated dosage forms accumulating on the mesh and reduces the dissolution ratio variations between dosage forms.

The mesh of the present invention is used for a dissolution test of the suspensions and solid dosage forms. It is placed under the bottom of the blade and over the bottom of the vessel in the dissolution test assembly equipped with a vessel specified in the dissolution test method of the Japanese Pharmacopoeia, the United States Pharmacopeia, or the European Pharmacopoeia, or a vessel used for the dissolution test, and a paddle comprising a blade and a shaft. Further, when the shape of the mesh is circular, the diameter is 10 to 95 mm, the size of the sieve opening is 2 to 200 mesh and the thickness is 0.04 to 2 mm. Preferably, the diameter is 12.5 to 90 mm, the sieve opening is 5 to 100 mesh and the thickness is 0.08 to 2 mm. More preferably, the diameter is 50 to 85 mm, the sieve opening is 10 to 60 mesh and the thickness is 0.1 to 1.2 mm. The mesh structure like this has a little risk of compounds, inactive ingredients, and the like in the disintegrated dosage forms accumulating on the mesh and reduces the dissolution ratio variations between dosage forms.

The material of the mesh of the present invention may be a material which is chemically inactive and does not interfere with the analysis since it is placed in the dissolution test container including the dissolution test medium. Specifically, the material may be a metal such as aluminum, stainless steel (SUS) or iron, or a plastic such as polyethylene, polypropylene or fluororesin.

The mesh of the present invention may be equipped with the edge without the sieve opening as shown in FIG. 2 to increase the strength of the mesh, ensure the safety of the operator, or allow the mesh to be fixed in place when it is placed in the vessel. The edge is 1-10 mm wide, preferably 1-9 mm, more preferably 1-8 mm. In this case, the outer diameter of the mesh including the sieve opening and the edge is usually 40 to 95 mm, preferably 45 to 90 mm, more preferably 50 to 85 mm. The inner diameter is usually 30 to 94 mm, preferably 36 to 88 mm, and more preferably 42 to 82 mm. The mesh equipped with the edge can be placed in the vessel of the dissolution test assembly as shown in FIG. 3.

The material of the mesh edge of the present invention may be a metal such as aluminum, stainless steel (SUS), iron, or inactive resin such as polyethylene, polypropylene, fluororesin or Teflon (registered trademark) so that the mesh is not corroded by water or the like and does not damage the glass such as vessel.

As the shape of the mesh edge of the present invention which contacts with the vessel, an R shape can be attached to the edge so as to follow the R of the vessel. The mesh can be stably fixed by providing a step at the end of the mesh. The height of the step may be a height at which the mesh can be stably fixed, and is usually 0.1 to 10 mm, preferably 0.2 to 7 mm, and more preferably 0.2 to 6 mm.

In order to fix the mesh of the present invention in place, legs may be attached to the mesh as shown in FIG. 4. When attaching legs to the mesh, the number of legs may be the number at which legs that can be fixed to the mesh. If the mesh is placed in the dissolution test assembly used for the dissolution test method of the Japanese Pharmacopoeia, the number of legs may be 3 to 6. The height of the legs may be a height at which the mesh can be stably fixed, and is usually 0.1 to 10 mm, preferably 0.2 to 7 mm, and more preferably 0.2 to 6 mm. The mesh provided with the legs can be placed in the vessel of the dissolution test assembly as shown in FIG. 5.

When the mesh of the present invention is not used, the addiction of suspensions or solid dosage forms to the vessel in the test medium may cause the components contained in the suspensions or the solid dosage forms to cone. With the use of the mesh, there is almost no coning of the components contained in suspensions and solid dosage forms. Coning is a phenomenon in which disintegrated products such as poorly soluble or insoluble substances are locally accumulated on the bottom of the vessel.

The present invention is a mesh for the dissolution test of an oral dosage forms, particularly solid dosage forms. The test uses the dissolution test assembly specified in the Japanese Pharmacopoeia dissolution test method. That is, the dissolution test assembly includes a container made of a glass or a transparent and chemically inactive material on which a lid can be put, that is a vessel, a motor, and a paddle comprising a shaft and a blade. The vessel can be heated by installing it in a constant temperature water tank of an appropriate size or by putting it in a constant temperature jacket or the like. The tank or jacket can be adjusted so that the temperature inside the vessel is 37±0.5° C. during the test, and the liquid in the tank moves smoothly. In addition to the smooth rotation of the paddle, rocking and vibration caused by the surrounding environment where the assembly is installed or the assembly itself should be suppressed.

The agitation unit of the dissolution test assembly may be the unit used for the "dissolution test method" specified in the Japanese Pharmacopoeia. As the unit, a paddle comprising a blade and a shaft can be used. The vertical axis of the blade penetrates the center of the shaft, and the lower chord of the blade is adjusted to flush with the lower end of the shaft.

The blade of the dissolution test assembly may be any blade used for the "dissolution test method" specified in the Japanese Pharmacopoeia.

The rotation axis of the dissolution test assembly may be any rotation axis used for the "dissolution test method" specified in the Japanese Pharmacopoeia. The axis should be rotated smoothly to prevent rocking and vibration that affect the result of dissolution. The rotation shaft may be a shaft whose length can be adjusted. For example, the length of the shaft can be adjusted stepwise by a movable shaft with a screw or a positioning attachment.

As the blade and the shaft, an integrated substance of metal or chemically inactive and robust material is used. If the blade and the shaft can be firmly fixed during the test, a paddle wherein both of them can be disassembled can be used. The blade and the shaft can be covered with a suitable coating to make them chemically inactive.

The dissolution test assembly conforms to the assembly used for the dissolution test method listed not only in the Japanese Pharmacopoeia but also in the United States Pharmacopeia or the European Pharmacopoeia.

When the dissolution ratio of a drug in suspensions or solid dosage forms is measured using the mesh of the present invention, the suspensions or the forms are added to or placed on the mesh in the vessel to perform a dissolution test. Suspensions mean the suspensions or syrups specified in the Japanese Pharmacopoeia. They also mean liquids in which the active ingredient is finely and homogeneously suspended, or viscous liquid or solid dosage forms containing sugars or sweeteners. The solid dosage forms mean solid formed dosage forms, which include a tablet, a capsule, a granule, and a pill specified in the Japanese Pharmacopoeia.

The sample for the dissolution test of suspensions, solid dosage forms and etc. is added to or placed on the mesh in the dissolution test vessel before starting the rotation of the blade. In this case, "addition" means adding the suspensions over the mesh, and "placement" means placing the solid dosage forms on the mesh. Even if suspensions or solid dosage forms are added to or placed on the mesh, the solid dosage forms may float. In this case, the suspensions or the solid dosage forms in the sinker may be added to or placed on the mesh in the vessel to perform the dissolution test. This makes it possible to prevent the solid dosage forms from floating. A sinker means a small and non-tightening vessel made of a chemically inactive material, such as a wire that is spirally wound several times.

The suspension or solid dosage forms include suspensions, syrup, tablets, capsules, granules and pills specified in the Japanese Pharmacopoeia. Particularly, if it is a sparingly soluble drug and an insoluble inactive ingredient, it exhibits the effect of the mesh of the present invention.

The drug may be either solid, powdery, crystalline, oily or solution-like, but any drug that can be produced as a suspension or a solid dosage form. For example, it is a kind or more than two kinds of components selected from nourishing tonic health drugs, antihypertensive, analgesic and anti-inflammatory drugs, psychotropic drugs, anxiolytics, antidepressants, hypnotic sedatives, antispasmodics, central nervous system drugs, cerebral metabolism improvers, cerebral circulation improvers, antiepileptic drugs, Sympathetic stimulants, gastrointestinal drugs, antacids, anti-ulcers, antitussive sputum, antiemetics, respiratory promoters, bronchial dilators, antiallergic drugs, dental and oral medicines, antihistamines, cardiotonics, arrhythmics, diuretics, Antihypertensive agents, vasodilators, coronary vasodilators, peripheral vasodilators, hyperlipidemia agents, sedatives, antibiotics, chemotherapeutic agents, diabetic agents, osteoporosis agents, antirheumatic agents, Skeletal muscle relaxants, sedatives, hormones, alkaloid drugs, sulfa drugs, gout remedies, blood coagulation inhibitors, anxiolytics, Alzheimer's disease remedies and the like.

When suspensions or solid dosage forms are added or placed on the mesh of the present invention and the paddle of the dissolution test assembly is rotated according to the behavior of the gastrointestinal tract, that is, the rotation speed of the paddle is 10 to 75 rpm, in some cases 10 to 50 rpm or 10 to 30 rpm, the drug is released from the suspensions or the solid dosage forms, and they are continuously released from the initial stage of the dissolution test.

When suspensions or solid dosage forms are added or placed on the mesh of the present invention and the paddle of the dissolution test assembly is rotated according to the behavior of the gastrointestinal tract, that is, the rotation speed of the paddle is 10 to 75 rpm, in some cases 10 to 50 rpm or 10 to 30 rpm, the drug is released from the suspensions or the solid dosage forms. In particular, in case that the dissolution test is performed repeatedly about the same dosage forms, when the mesh of the present invention, the variation in dissolution behavior can be smaller and the dissolution ratio CV % can be suppressed within 20% as compared with the case where it is not used. CV % is an abbreviation for Coefficient of Variation, which is generally used as an index of data variation and can be calculated by the following formula.

$$CV\% = (\text{standard deviation/average value}) \times 100$$

The simulated profile of the plasma concentration from the gastrointestinal absorption is calculated by using the observed dissolution test results obtained by adding or placing suspensions or solid dosage forms on the mesh of the present invention and rotating the paddle of the dissolution test assembly according to the behavior of the gastrointestinal tract. Compared the simulated profile with the observed profile of the plasma concentration, they are almost the same, thus the plasma concentration of gastrointestinal absorption can be simulated by using the dissolution test results. As a simulation method of the plasma concentration of in vivo gastrointestinal absorption from in vitro dissolution result, there is the method using commercially available human PK simulation software.

Examples

Hereinafter, the present invention is specified in detail with reference to Examples, Comparative Examples and Reference Examples, but the present invention is not limited thereto.

1. Dissolution Test of Lipitor Tablets 10 mg (Drug Substance: Atorvastatin Calcium)

1) Dissolution Test Method (Apparatus 2, Paddle Apparatus))

The mesh for the dissolution test (diameter: 72 mm, outer diameter: 72 mm, inner diameter: 60 mm, thickness: 0.37 mm) was placed at 25 mm under the bottom of the blade and 16 mm over the bottom of the vessel (cylindrical with a hemispherical bottom, volume: 1 L, height: about 170 mm, inner diameter about 100 mm) in the dissolution test assembly (manufactured by Toyama Sangyo Co., Ltd.) specified in the 17th revised Japanese Pharmacopoeia dissolution test method. After that, 900 mL of Fasted State Simulated Intestinal Fluid (FaSSIF) (pH about 6.5) was placed in the vessel, and the water temperature was adjusted to 37±0.5° C. Lipitor Tablets 10 mg (manufactured by Astellas Pharma Inc.) was placed on the mesh. The dissolution test was conducted under the following conditions and repeated 3 times.

(Dissolution Test Conditions)

Test method: Japanese Pharmacopoeia Apparatus 2 (Paddle Apparatus)

Agitation speed of the blade: 30 rpm

Sampling time of test medium: 0, 5, 10, 15, 20, 30, 45, 60, 75, 90, and 120 (min)

The dissolution test is conducted with the mesh of the present invention (Example 1) and without the mesh (Comparative Example 1), and in basket apparatus described below (Comparative Example 2).

2) Dissolution test method (Apparatus 1 (the basket apparatus)

Test method: Japanese Pharmacopoeia Apparatus 1 (the basket apparatus)

Agitation speed of the blade: 40 rpm

Sampling time of test medium: 0, 5, 10, 15, 20, 30, 45, 60, 75, 90, and 120 (min)

3) Analytical Method

The amount of compound of the samples and standard medium were measured by liquid chromatography under the following analytical conditions.

(Analysis Conditions)

Column: AQUITY UPLC CSH C18, 1.7 μm 2.1×50 mm (manufactured by Waters)

Column temperature: 40° C.

Mobile phase flow rate: 0.4 mL/min

Detector: UV detector (measurement wavelength: 246 nm)

Mobile phase A: 50 mM ammonium formate aqueous solution

Mobile phase B: acetonitrile

Mobile phase ratio: Mobile phase A/Mobile phase B=40/60

Experimental Result

FIG. 6 shows the transition of the average value and standard deviation of the 3 repetitions dissolution ratio. Table 1 shows the values of the average value, standard deviation, and CV % of the dissolution ratio.

The dissolution behavior of the dosage forms in Comparative Example 1 and 2 remained at a lower level than that of the dosage forms in Example 1. Further, it was clarified that the standard deviation and CV (%) of the dissolution ratios of the dosage forms in Comparative Example 1 and 2 were larger than those of the dosage forms in Example 1 and the variation of the dissolution ratio was large. After the completion of the test, the dosage forms in Example 1 did not cause coning, but the dosage forms in Comparative Example 1 and 2 cause coning, respectively in the bottom of the dissolution test vessel and in the basket.

2. Dissolution Test of Baxocapsule 20 (Drug Substance: Piroxicam)

1) Dissolution Test Method (Apparatus 2, Paddle Apparatus)

The mesh for the dissolution test (diameter: 72 mm, outer diameter: 72 mm, inner diameter: 60 mm, thickness: 0.37 mm) was placed at 25 mm under the bottom of the blade and 16 mm over the bottom of the vessel (cylindrical with a hemispherical bottom, volume: 1 L, height: about 170 mm, inner diameter about 100 mm) in the dissolution test assembly (manufactured by Toyama Sangyo Co., Ltd.) specified in the 17th revised Japanese Pharmacopoeia dissolution test method. After that, 900 mL of Fasted State Simulated Intestinal Fluid (FaSSIF) (pH about 6.5) was poured in the vessel, and the water temperature was adjusted to 37±0.5° C. Baxocapsule 20 (manufactured by Fuji Film Toyama Chemical Co., Ltd.) was placed on the mesh. The condition of the dissolution test followed the conditions of Example 1, Comparative 1 and 2. This Test was Repeated 3 Times.

The dissolution test is conducted with the mesh of the present invention (Example 2) and without the mesh (Comparative Example 3), and in basket apparatus described below (Comparative Example 4).

2) Analytical Method

The amount of compound of the samples and standard medium were measured by liquid chromatography under the following analytical conditions.

(Analysis Conditions)

Column: AQUITY UPLC CSH C18, 1.7 μm 2.1×50 mm (manufactured by Waters)

Column temperature: 40° C.

Mobile phase flow rate: 0.4 mL/min

Detector: UV detector (measurement wavelength: 254 nm)

TABLE 1

| Time after the start of the test (min) | Example 1 | | | Comparative Example 1 | | | Comparative Example 2 | | |
|---|---|---|---|---|---|---|---|---|---|
| | Average dissolution ratio (%) | Standard deviation of dissolution ratio | CV (%) | Average dissolution ratio (%) | Standard deviation of dissolution ratio | CV (%) | Average dissolution ratio (%) | Standard deviation of dissolution ratio | CV (%) |
| 0 | 0 | 0 | — | 0 | 0 | — | 0 | 0 | — |
| 5 | 27.5 | 2.1 | 7.6 | 11.5 | 4.8 | 41.4 | 20.5 | 12.8 | 62.7 |
| 10 | 33.7 | 2.8 | 8.2 | 13.7 | 5.4 | 39.4 | 27.5 | 16.8 | 60.9 |
| 15 | 37.0 | 2.8 | 7.6 | 14.6 | 5.6 | 38.4 | 32.0 | 18.5 | 58.0 |
| 20 | 39.7 | 3.3 | 8.2 | 15.3 | 5.6 | 36.4 | 35.1 | 19.3 | 55.0 |
| 30 | 44.3 | 4.3 | 9.7 | 17.0 | 5.7 | 33.9 | 38.9 | 19.7 | 50.7 |
| 45 | 50.4 | 4.8 | 9.5 | 19.5 | 4.5 | 23.2 | 42.9 | 20.0 | 46.5 |
| 60 | 55.3 | 4.8 | 8.7 | 22.2 | 3.8 | 16.9 | 46.2 | 19.7 | 42.6 |
| 75 | 59.4 | 4.7 | 7.8 | 25.1 | 4.5 | 17.8 | 48.8 | 19.9 | 40.7 |
| 90 | 62.6 | 4.7 | 7.5 | 27.5 | 5.7 | 20.9 | 50.9 | 20.1 | 39.4 |
| 120 | 68.4 | 6.1 | 8.9 | 30.6 | 6.7 | 21.8 | 54.5 | 20.3 | 37.3 |

Mobile phase A: 50 mM ammonium formate aqueous solution
Mobile phase B: acetonitrile
Mobile phase ratio: Mobile phase A/Mobile phase B=40/60

Experimental Result

FIG. 7 shows the transition of the average value and standard deviation of the dissolution ratio of 3 repetitions. Table 2 shows the values of the average value, standard deviation, and CV % of the dissolution ratio.

TABLE 2

| Time after the test starts (min) | Example 2 | | | Comparative Example 3 | | | Comparative Example 4 | | |
|---|---|---|---|---|---|---|---|---|---|
| | Average dissolution ratio (%) | Standard deviation of dissolution ratio | CV (%) | Average dissolution ratio (%) | Standard deviation of dissolution ratio | CV (%) | Average dissolution ratio (%) | Standard deviation of dissolution ratio | CV (%) |
| 0 | 0 | 0.0 | — | 0 | 0.0 | — | 0 | 0.0 | — |
| 5 | 32.7 | 3.9 | 11.9 | 22.8 | 7.5 | 32.9 | 29.9 | 8.0 | 26.8 |
| 10 | 78.6 | 7.4 | 9.5 | 51.8 | 10.8 | 20.8 | 55.7 | 5.1 | 9.2 |
| 15 | 90.2 | 2.5 | 2.7 | 60.8 | 7.4 | 12.2 | 68.1 | 7.6 | 11.2 |
| 20 | 93.8 | 0.9 | 1.0 | 65.8 | 4.4 | 6.7 | 74.9 | 10.8 | 14.4 |
| 30 | 95.4 | 1.6 | 1.7 | 69.6 | 3.4 | 4.8 | 83.1 | 10.8 | 12.9 |
| 45 | 96.6 | 2.3 | 2.4 | 72.4 | 3.8 | 5.2 | 92.9 | 8.4 | 9.0 |
| 60 | 97.1 | 2.5 | 2.5 | 74.2 | 4.4 | 5.9 | 95.2 | 6.6 | 6.9 |
| 75 | 97.7 | 2.4 | 2.4 | 75.8 | 4.7 | 6.2 | 96.2 | 5.0 | 5.2 |
| 90 | 98.0 | 2.6 | 2.7 | 77.2 | 5.0 | 6.5 | 97.3 | 3.4 | 3.5 |
| 120 | 98.5 | 3.0 | 3.0 | 79.5 | 5.2 | 6.6 | 99.2 | 1.1 | 1.1 |

The dissolution behavior of the dosage forms 3 and 4 at the initial stage of the dissolution test remained at a lower level than that of the dosage forms of Example 2. It was clarified that the standard deviation and CV (%) of the dissolution ratio about the dosage forms 3 and 4 at the initial stage of the dissolution test were larger than those of Example 2. It was also revealed that the variation of the dissolution ratio at the initial stage of the dissolution test was large. During the test, the granules in the capsule of Example 2 were present without being covered with the capsule skin, but the granules in the capsules of Comparative Examples 3 and 4 with being covered.

3. Dissolution Test of Celecox Tablets 100 mg (Drug Substance: Celecoxib)

1) Dissolution Test Method (Apparatus 2, Paddle Apparatus)

The mesh for the dissolution test (diameter: 72 mm, outer diameter: 72 mm, inner diameter: 60 mm, thickness: 0.37 mm) was placed at 25 mm under the bottom of the blade and 16 mm over the bottom of the vessel (cylindrical with a hemispherical bottom, volume: 1 L, height: about 170 mm, inner diameter about 100 mm) in the dissolution test assembly (manufactured by Toyama Sangyo Co., Ltd.) specified in the 17th revised Japanese Pharmacopoeia dissolution test method. After that, 900 mL of Fasted State Simulated Intestinal Fluid (FaSSIF) (pH about 6.5) was poured in the vessel, and the water temperature was adjusted to 37±0.5° C. Celecox Tablets 100 mg (manufactured by Astellas Pharma Inc.) was placed on the mesh. The condition of the dissolution test followed the conditions of Example 1. This test was repeated 3 times.

The dissolution test is conducted with the mesh of the present invention (Example 3) and without the mesh (Comparative Example 5).

2) Analytical Method

The amount of compound of the samples and standard medium were measured by liquid chromatography under the following analytical conditions.

(Analysis Conditions)
Column: AQUITY UPLC CSH C18, 1.7 µm 2.1×50 mm (manufactured by Waters)
Column temperature: 40° C.
Mobile phase flow rate: 0.4 mL/min
Detector: UV detector (measurement wavelength: 249 nm)
Mobile phase A: 50 mM ammonium formate aqueous solution
Mobile phase B: acetonitrile
Mobile phase ratio: Mobile phase A/Mobile phase B=40:60

3) PK Simulation Test

The parameters shown in Tables 3 and 4 were input using the PK simulation software GastroPlus (Registered Trademark) 9.6 (manufactured by SimulationPlus). As a control, the simulation curve was also calculated when the drug was administered as solution dosage forms without inputting the dissolution test data.

TABLE 3

| Parameter | Value |
|---|---|
| Molecular weight (g/mol) | 381.37 |
| pKa | 11.1 |
| logP | 4.21 |
| Dose (mg) | 100 |
| Dose volume (mL) | 150 |
| Mean Precipitation Time (sec) | 900 |
| Diff. Coeff. (cm$^2$/s × 10$^5$) | 0.6753 |
| Drug Particle Density (g/mL) | 1.2 |

TABLE 4

| Parameter | Value |
|---|---|
| Plasma $F_{up}$ (%) | 2.1 |
| CL (L/h) | 28.558 |
| Vc (L/kg) | 1.0902 |
| $k_{12}$ (1/h) | 0.19554 |
| $k_{21}$ (1/h) | 0.07268 |

Experimental Result

1) Dissolution Test

FIG. 8 shows the transition of the average value and standard deviation of the dissolution ratio of 3 repetitions.

Table 5 shows the values of the average value, standard deviation, and CV % of the dissolution ratio.

TABLE 5

| Time (min) after the start of the test | Example 3 | | | Comparative Example 5 | | |
|---|---|---|---|---|---|---|
| | Average dissolution ratio (%) | Standard deviation of dissolution ratio | CV (%) | Average dissolution ratio (%) | Standard deviation of dissolution ratio | CV (%) |
| 0 | 0.0 | 0.0 | — | 0.0 | 0.0 | — |
| 5 | 2.5 | 0.1 | 2.3 | 1.4 | 0.2 | 14.6 |
| 10 | 107.3 | 0.2 | 2.2 | 3.8 | 0.2 | 4.7 |
| 15 | 12.4 | 0.4 | 3.0 | 7.3 | 0.3 | 4.6 |
| 20 | 17.2 | 0.6 | 3.6 | 10.7 | 0.4 | 4.0 |
| 30 | 24.6 | 0.7 | 2.8 | 16.7 | 0.7 | 3.9 |
| 45 | 31.1 | 0.7 | 2.2 | 23.6 | 0.8 | 3.5 |
| 60 | 34.7 | 0.5 | 1.3 | 28.0 | 1.1 | 4.0 |
| 75 | 36.3 | 0.5 | 1.3 | 30.7 | 1.3 | 4.3 |
| 90 | 37.3 | 0.3 | 0.8 | 32.4 | 1.4 | 4.4 |
| 120 | 38.3 | 0.3 | 0.9 | 34.2 | 1.5 | 4.4 |

The dissolution behavior of the Comparative Example 5 dosage forms at the initial stage remained at a lower level than that of Example 3 dosage forms. It was clarified that the standard deviation and CV (%) of the dissolution ratio of the test about the Comparative Example 5 dosage forms were larger than those of the Example 3 dosage forms. It was also revealed that the dissolution ratio variation in the test was large. After the completion of the test, the Example 3 dosage forms did not cause coning, but the Comparative Example 5 dosage forms caused coning at the bottom of the dissolution test vessel.

2) PK Simulation Test

FIG. 9 shows a graph of the plasma concentration of the Example 3 dosage forms based on PK simulation. Table 6 shows the PE (%, simulation error with respect to actual measurement) of the predicted PK value. "With dissolution process" in FIG. 9 and table 6 means the case predicted with inputting data obtained from the dissolution test. "Without dissolution process" means the case predicted with estimating the drug was administered as a solution without inputting data. When the absolute value of PE is 20 or less, the predicted and the measured value are in good agreement. When the dissolution test was performed using the mesh of the present invention and the predicted value of the plasma concentration was compared with the measured value of the plasma concentration, the absolute value of PE was 20 or less for both Cmax and AUC, which was the same as the simulated value. It was clarified that the measured values were in good agreement. On the other hand, the absolute value of PE of Cmax simulated without using the result of the dissolution test was 20 or more, and it became clear that the measured value and the simulated value did not match.

TABLE 6

| Forecast | % PE ($C_{max}$) | % PE (AUC) |
|---|---|---|
| Without dissolution process | 53.9 | −1.4 |
| With dissolution process | −11.9 | −12.7 |

4. Dissolution Test of Tegretol Tablets 200 mg (Drug Substance: Carbamazepine)

1) Dissolution Test Method (Apparatus 2, Paddle Apparatus)

The mesh for the dissolution test (diameter: 72 mm, outer diameter: 72 mm, inner diameter: 60 mm, thickness: 0.37 mm) was placed at 25 mm under the bottom of the blade and 16 mm over the bottom of the vessel (cylindrical with a hemispherical bottom, volume: 1 L, height: about 170 mm, inner diameter about 100 mm) in the dissolution test assembly (manufactured by Toyama Sangyo Co., Ltd.) specified in the 17th revised Japanese Pharmacopoeia dissolution test method. After that, 900 mL of Fasted State Simulated Intestinal Fluid (FaSSIF) (pH about 6.5) was poured in the vessel, and the water temperature was adjusted to 37±0.5° C. Tegretol Tablets 200 mg (manufactured by Mitsubishi Tanabe Pharma Corporation) was placed on the mesh. The condition of the dissolution test followed the conditions of Example 1. This test was repeated 3 times.

The dissolution test is conducted with the mesh of the present invention (Example 4) and without the mesh (Comparative Example 6).

2) Analytical Method

The amount of compound of the samples and standard medium were measured by liquid chromatography under the following analytical conditions.

(Analysis Conditions)
- Column: AQUITY UPLC CSH C18, 1.7 μm 2.1×50 mm (manufactured by Waters)
- Column temperature: 40° C.
- Mobile phase flow rate: 0.4 mL/min
- Detector: UV detector (measurement wavelength: 286 nm)
- Mobile phase A: 50 mM ammonium formate aqueous solution
- Mobile phase B: acetonitrile
- Mobile phase ratio: Mobile phase A/Mobile phase B=70:30

3) PK Simulation Test

The parameters shown in Tables 7 and 8 were input using the PK simulation software GastroPlus (Registered Trademark) 9.6 (manufactured by SimulationPlus). As a control, the simulation curve was also calculated when the drug was administered as solution dosage forms without inputting the dissolution test data.

TABLE 7

| Parameter | Value |
|---|---|
| Molecular weight (g/mol) | 236.27 |
| pKa | 13.9 |
| logP | 1.8 |
| Dose (mg) | 200 |
| Dose volume (mL) | 150 |
| Mean Precipitation Time (sec) | 900 |
| Diff. Coeff. ($cm^2/s \times 10^5$) | 0.75 |
| Drug Particle Density (g/mL) | 1.2 |

TABLE 8

| Parameter | Value |
|---|---|
| Plasma $F_{up}$ (%) | 28.8 |
| CL (L/h) | 0.90868 |
| Vc (L/kg) | 0.69713 |
| $k_{12}$ (1/h) | 0.165 |
| $k_{21}$ (1/h) | 0.337 |

Experimental Result

1) Dissolution Test

The transition of the average value and standard deviation of the dissolution ratio of 3 repetitions is shown in FIG. 10, and the values of the average value, standard deviation and CV % of the dissolution ratio are shown in Table 9, respectively.

TABLE 9

| Time (min) after the start of the test | Example 4 | | | Comparative Example 6 | | |
|---|---|---|---|---|---|---|
| | Average dissolution ratio (%) | Standard deviation of dissolution ratio | CV (%) | Average dissolution ratio (%) | Standard deviation of dissolution ratio | CV (%) |
| 0 | 0 | 0.0 | — | 0 | 0.0 | — |
| 5 | 16.5 | 1.5 | 9.3 | 3.4 | 0.0 | 1.1 |
| 10 | 32.8 | 0.5 | 1.6 | 7.6 | 0.8 | 10.0 |
| 15 | 36.6 | 1.1 | 2.9 | 10.9 | 1.6 | 14.6 |
| 20 | 38.2 | 1.3 | 3.3 | 13.5 | 2.3 | 17.0 |
| 30 | 39.8 | 1.1 | 2.9 | 16.4 | 2.3 | 14.2 |
| 45 | 41.8 | 1.2 | 2.9 | 19.5 | 1.9 | 9.5 |
| 60 | 43.7 | 1.3 | 3.0 | 22.4 | 1.2 | 5.2 |
| 75 | 45.3 | 1.3 | 2.9 | 24.1 | 1.2 | 5.0 |
| 90 | 46.8 | 1.4 | 2.9 | 26.2 | 1.4 | 5.5 |
| 120 | 49.3 | 1.4 | 2.7 | 29.0 | 2.1 | 7.4 |

The dissolution behavior of the Comparative Example 6 dosage forms at the initial stage remained at a lower level than that of Example 4 dosage forms. It was clarified that the standard deviation and CV (%) of the dissolution ratio of the test about the Comparative Example 6 dosage forms were larger than those of the Example 4 dosage forms. It was also revealed that the dissolution ratio variation in the test was large. After the completion of the test, the Example 4 dosage forms did not cause coning, but the Comparative Example 6 dosage forms caused coning at the bottom of the dissolution test vessel.

2) PK Simulation Test

FIG. 11 shows a graph of the plasma concentration of the Example 4 dosage forms based on PK simulation. Table 10 shows the PE (%, simulation error with respect to actual measurement) of the simulated PK value. "With dissolution process" in FIG. 11 and table 10 means the case simulated with inputting data obtained from the dissolution test. "Without dissolution process" means the case simulated with estimating the drug was administered as a solution without inputting data. When the absolute value of PE is 20 or less, the simulated and the measured value are in good agreement. When the dissolution test was performed using the mesh of the present invention and the simulated value of the plasma concentration was compared with the measured value of the plasma concentration, it was clarified that the absolute value of PE was 20 or less for both Cmax and AUC and the measured values were in good agreement. On the other hand, the absolute value of PE of Cmax simulated without using the result of the dissolution test was 20 or more, and it became clear that the measured value and the simulated value did not match.

TABLE 10

| Forecast | % PE ($C_{max}$) | % PE (AUC) |
|---|---|---|
| Without dissolution process | 20.50 | −1.18 |
| With dissolution process | 10.41 | −2.47 |

INDUSTRIAL APPLICABILITY

It was revealed that the drug was released from the dosage forms even at a low speed of the paddle according to the dissolution property in the gastrointestinal tract in case that the mesh of the present invention is placed in the vessel of the dissolution test assembly and the suspensions or the solid dosage forms are added to or placed on the mesh. Moreover, even when the dissolution ratios of the multiple identical dosage forms were measured, there was little variation in the dissolution ratios. The mesh, the vessel which the mesh is placed on and the dissolution test assembly of the present invention can measure the dissolution ratio of a drug from a dosage forms including poorly water-soluble drug and an insoluble inactive ingredient in the gastrointestinal tract.

The invention claimed is:

1. A method of preventing coning of a suspension or a solid dosage form selected from the group consisting of a suspension, a syrup, a tablet, a capsule, a granule and a pill in a dissolution test of the suspension or the solid dosage form, the method comprising:
    using one single-layer mesh for the test,
    placing the one single-layer mesh under a bottom of a blade and above a bottom of a vessel in a dissolution test assembly comprising the vessel used in the dissolution test, and a paddle comprising the blade and a shaft, wherein the paddle has a rotating speed of 10 to 30 rpm, and
    placing the suspension or the solid dosage form on the one single-layer mesh.

2. The method according to claim 1, wherein the one single-layer mesh is placed at 5 to 35 mm under the bottom of the blade.

3. The method according to claim 1, wherein the one single-layer mesh is placed at 1 to 30 mm above the bottom of the vessel.

4. The method according to claim 1, wherein the one single-layer mesh is placed at 5 to 35 mm under the bottom of the blade and at 1 to 30 mm above the bottom of the vessel.

5. The method according to claim 1, further comprising forming the one single-layer mesh into a circle having a diameter between 10 and 95 mm.

6. The method according to claim 1, wherein the one single-layer mesh has a sieve opening of 2 to 200 mesh.

7. The method according to claim 1, wherein the one single-layer mesh comprises an edge part.

8. The method according to claim 1, wherein the one single-layer mesh comprises a leg part.

* * * * *